(12) United States Patent
Novotny

(10) Patent No.: US 11,620,561 B2
(45) Date of Patent: Apr. 4, 2023

(54) METHOD AND SYSTEM FOR A QUANTUM ORACLE TO OBTAIN THE NUMBER OF QUANTUM GROUND STATES

(71) Applicant: Mark A. Novotny, Columbus, MS (US)

(72) Inventor: Mark A. Novotny, Columbus, MS (US)

( * ) Notice: Subject to any disclaimer, the term of this patent is extended or adjusted under 35 U.S.C. 154(b) by 836 days.

(21) Appl. No.: 16/427,112

(22) Filed: May 30, 2019

(65) Prior Publication Data
US 2019/0370680 A1 Dec. 5, 2019

Related U.S. Application Data

(60) Provisional application No. 62/677,989, filed on May 30, 2018.

(51) Int. Cl.
*G06N 10/00* (2022.01)

(52) U.S. Cl.
CPC ................... *G06N 10/00* (2019.01)

(58) Field of Classification Search
CPC ........ G06N 10/00; G06N 10/20; G06N 10/40; G06N 10/60; G06N 10/70; G06N 10/80
See application file for complete search history.

(56) References Cited

U.S. PATENT DOCUMENTS

| | | | |
|---|---|---|---|
| 6,633,053 B1 | 10/2003 | Jaeger | |
| 7,411,187 B2 | 8/2008 | Monroe | |
| 9,350,460 B2 | 5/2016 | Paik | |
| 9,355,362 B2 | 5/2016 | Shea | |
| 9,369,133 B2 | 6/2016 | Naaman | |
| 9,396,440 B2 | 7/2016 | Macready | |
| 9,524,470 B1 | 12/2016 | Chow | |
| 9,530,873 B1 | 12/2016 | Carroll | |
| 9,721,209 B2 | 8/2017 | Kliuchnikov | |
| 9,773,208 B2 | 9/2017 | Betz | |
| 9,882,112 B2 | 1/2018 | Kwon | |
| 9,886,668 B2 | 2/2018 | Dzurak | |
| 9,934,468 B2 | 4/2018 | Mohseni | |
| 9,953,269 B2 | 4/2018 | Chow | |
| 2018/0336299 A1* | 11/2018 | Barzegar | G06F 30/20 |

OTHER PUBLICATIONS

Gaitan, Frank, and Lane Clark. "Graph isomorphism and adiabatic quantum computing." Physical Review A 89.2 (2014): 022342. (Year: 2014).*
Novotny, M. A., et al. "Quantum decoherence and thermalization at finite temperature within the canonical-thermal-state ensemble." Physical Review A 93.3 (2016): 032110. (Year: 2016).*
Brown, Brielin, Steven T. Flammia, and Norbert Schuch. "Computational difficulty of computing the density of states." Physical review letters 107.4 (2011): 040501. (Year: 2011).*
Lucas, Andrew. "Ising formulations of many NP problems." Frontiers in physics (2014): 5. (Year: 2014).*

(Continued)

*Primary Examiner* — Markus A. Vasquez
(74) *Attorney, Agent, or Firm* — Conley Rose, P.C.

(57) ABSTRACT

The present invention provides new methods, systems, and apparatus, including quantum programs and methodology, to construct a quantum oracle to obtain or to provide the exact value, or a range of values, of the number of ground states of a given quantum problem system.

18 Claims, 5 Drawing Sheets

(56) References Cited

OTHER PUBLICATIONS

Gaitan, Frank, and Lane Clark. "Ramsey numbers and adiabatic quantum computing." Physical review letters 108.1 (2012): 010501 . (Year: 2012).*
Albash, "Adiabatic quantum computation," Reviews of Modem Physics, vol. 90, article 015002, 2018, 64 pages.
Brawn, et al., "Computational difficulty of computing the density of states," Physical Review Letters 107, 040501, 2011, 4 pages.
Hadfield, et al., "From the Quantum Approximate Optimization Algorithm to a Quantum Alternating Operator Ansats," Algorithms, vol. 34, 2019, pp. 1-45.
Novotny, et al., "Quantum decoherence and thermalization at finite temperature within the canonical-thermal-state ensemble," Physical Review A., vol. 93, Article 032110, 2016, 46 pages.
Roth, "On the hardness of approximate reasoning," Artificial Intelligence, vol. 82, 1996, pp. 1-2.

* cited by examiner

METHOD AND SYSTEM FOR A QUANTUM ORACLE TO OBTAIN THE NUMBER OF QUANTUM GROUND STATES

CROSS-REFERENCE TO RELATED APPLICATION

This application claims priority from U.S. Provisional Patent Application Ser. No. 62/677,989 filed May 30, 2018. The entirety of the provisional application is incorporated herein by reference.

STATEMENT OF GOVERNMENT SUPPORT

This invention was made with government support under grant/contract DMR-1206233 awarded by the National Science Foundation. The government has certain rights in the invention.

FIELD OF THE INVENTION

This invention relates to the field of entangled quantum systems, including quantum computers and, more specifically, to a novel method, system, and apparatus for a quantum oracle for providing or obtaining the number of quantum ground states. The invention provides a new method, system, and apparatus for utilizing either an adiabatic quantum process, i.e., an adiabatic quantum computer, for example, a gate-based quantum computer, a hybrid quantum computer, or a combination thereof, to obtain the number of ground states for a quantum problem Hamiltonian.

BACKGROUND OF THE INVENTION

The present invention relates to constructing and programming quantum hardware to provide a method, system, and apparatus of a quantum oracle for counting problems. The quantum oracle returns the number of ground states, also called the ground state degeneracy, of a quantum problem Hamiltonian. The oracle may provide the exact ground state degeneracy and/or may provide a bracketing of the ground state degeneracy. The invention provides a method, system, and apparatus, including quantum programs and methodologies, to construct a quantum oracle to provide the exact value, or a range of values, of the number of ground states of a given quantum problem system.

Currently, adiabatic quantum computers are able to obtain a ground state from a problem Hamiltonian. The problem Hamiltonian and the adiabatic procedure can be implemented, for example, using qubits constructed from superconducting squids (superconducting quantum interference devices). The present invention provides an adiabatic quantum process, computer, and/or machine to obtain, provide, or return the number of ground states.

Currently, gate-based quantum computers are able to input a register of qubits which are the initial states of the calculation, and perform a sequence of unitary gate operations on the entangled qubit register, ending with and/or interspersed with a sequence of full or partial measurements of the quantum system. Note that the unitary operations are reversible, while the full or partial measurements procedures are not reversible. The qubit register, the unitary gates, and the measurement procedures can be implemented using a qubit implementation, such as superconducting trapped ion, or entangled photons. The present invention provides a gated quantum computer or machine to obtain, provide, or return the number of ground states. In the future, it is possible that quantum computing devices will be a hybrid of annealing machines and gated machines. The present invention provides a method, system, and apparatus wherein such a hybrid adiabatic and/or gated quantum computer or machine can obtain, provide, and/or return the number of ground states.

SUMMARY OF THE INVENTION

The present invention provides a novel method, system, and apparatus, including quantum programs and methodologies, to construct a quantum oracle to provide the exact value, or a range of bracketing values, of the number of ground states of a given quantum problem system.

Quantum computers can perform computations that classical computers cannot perform. Classical or conventional computers use bits (a state is either 0 or 1), while quantum computers use qubits (which can simultaneously be a superposition of the states 0 and 1). An adiabatic quantum computer (AQC) slowly changes a Hamiltonian (the interactions with a qubit or between a number of qubits) to ultimately enable performance of the measurement of desired quantities on a problem Hamiltonian. Currently, adiabatic quantum computers obtain a ground state (the lowest energy state) of the problem Hamiltonian. The present invention comprises a method, system, and apparatus to count and/or to obtain the number of ground states in the problem Hamiltonian. A gated quantum computer starts with a given qubit register as the initial quantum state or wavefunction, and applies unitary gate operations and/or partial measurements to this wavefunction in an order which can be programmed, before a measurement is made on the final wavefunction.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention as follows.

DETAILED DESCRIPTION OF THE INVENTION

The present invention provides a novel method, system, and apparatus, including quantum programs and methodologies, to construct a quantum oracle to provide the exact value, or a bracketing range of values, of the number of ground states of a given quantum problem system. A quantum oracle is defined as a device or machine based on quantum principles which has an input string of classical bits as a query and returns a string of classical bits as a reply. The reply has a certain probability of being correct given the query, with said probability of returning the correct classical bit string larger or greater than that due to random guesses.

The invention provides methodology to obtain a measure of the degeneracy of a quantum system. Further, the invention discloses the method and system to get the entirety, i.e., the wavefunctions of the quantum system, into the Canonical-Thermal-State Ensemble (CTSE). This can be accomplished either by an adiabatic quantum process (adiabatic quantum computer) or by a gated quantum computer, utilizing any procedure and/or algorithm to obtain a wavefunction drawn from a thermal state ensemble, assuming the equivalence of the thermal state ensemble and the CTSE and measuring appropriate quantities.

Every quantum system can be considered to be given by a Hamiltonian H. A state with the lowest energy for a Hamiltonian is called a ground state. If there is more than one state for a given Hamiltonian which is a ground state, the ground state energy is said to be degenerate, with the total number of ground states called the ground state degeneracy g. Throughout this description, g is shorted to degeneracy, with the understanding g is the ground state degeneracy.

The present invention provides the ability to devise and program quantum hardware which acts as a quantum oracle, giving for a particular quantum problem Hamiltonian HC the ground state degeneracy $g_P$. Due to measurement error, the quantum oracle may, instead of giving an exact degeneracy, return the result that the degeneracy is within some range. For example, sometimes the quantum oracle may state the degeneracy is $g_P=3$, and other times return the result that the degeneracy is $2 \leq g_P \leq 5$. The invention includes both #P (classical-type) problems and #BQP (quantum-type) problems.

Figure 1:
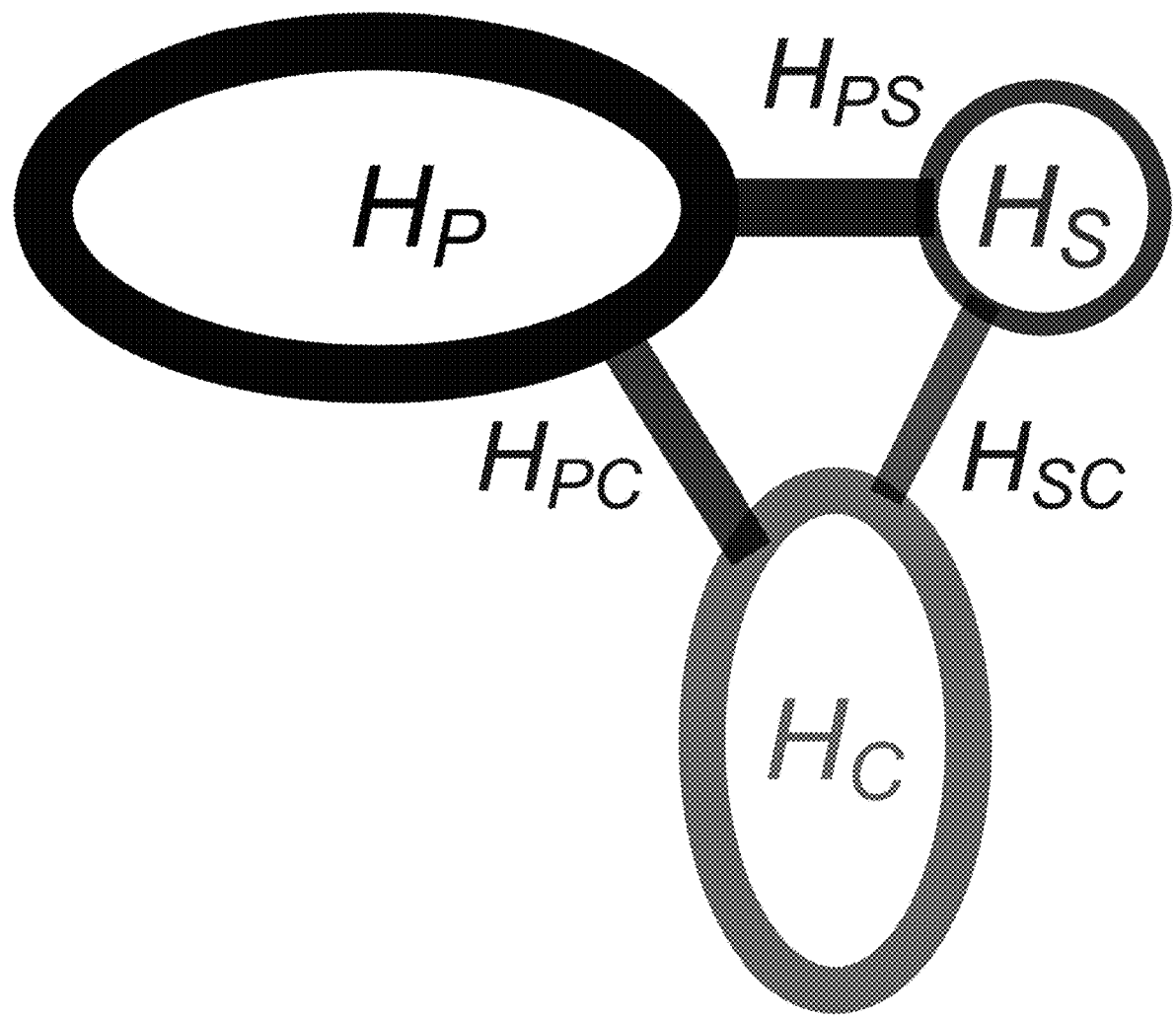
FIG. 1 shows a sketch of the setup of the quantum entirety and defines the three Hamiltonians of the different parts, $H_P$, $H_S$, and $H_C$, as well as three additional coupling parts of the Hamiltonian that connect the $H_P$, $H_S$, and $H_C$ parts of the quantum entirety.

The present invention requires three or more quantum systems, all of which can be manipulated and/or programmed by an adiabatic, a gated, or a hybrid quantum computing system or machine. The parts are labeled P, S, and C, or $H_p$, $H_s$, and $H_c$, as shown in FIG. 1, which shows the setup of the quantum entirety and defines the three Hamiltonians of the different parts. The first portion or part is P, the problem Hamiltonian $H_P$, and the quantum oracle finds and returns the ground state degeneracy $g_P$ for P. The second portion or part S is the part of the entirety that is the measured part of the Hamiltonian and is the measurement system, governed by the quantum Hamiltonian $H_S$, which has a known ground state degeneracy $g_S$, and is the only quantum system which may need to be measured. The third portion or part C of the entirety has a quantum Hamiltonian $H_C$, which at the time when S is measured has a ground state degeneracy $g_C=1$. Part C is utilized to place the combination P+S into a state such that measured quantities of S are as if they are drawn from a canonical thermal state ensemble of P+S at a given temperature. Alternatively, the entirety Hamiltonian H may be placed into a thermal state at a temperature T. In addition, all three parts of the quantum entirety are, or alternatively may be, coupled to each other with the coupling Hamiltonians $H_{PS}$, coupling P and S, and similarly for the other two possible coupling Hamiltonians $H_{PC}$ and $H_{SC}$, as shown. FIG. 1 shows the six Hamiltonians (three parts and three coupling Hamiltonians) utilized in the present invention. There may also be many-body terms in the Hamiltonian of the entirety P+S+C, but for simplicity these will not be mentioned further. Furthermore, both S and C may be composed of many uncoupled subparts, but for concreteness unless explicitly stated otherwise it will be assumed that each is comprised of only one connected quantum system.

Measures of quantum decoherence and thermalization of a quantum system at finite temperature in the presence of a quantum environment and within the canonical-thermal-state ensemble have been studied and analyzed. See M. A. Novotny, F. Jin, S. Yuan, S. Miyashita, H. De Raedt, and K. Michielsen, "Quantum decoherence and thermalization at finite temperature within the canonical-thermal-state ensemble", Physical Review A, vol. 93, article 032110 [46 pages] (2016). The invention utilizes such analyses, where it was shown, both via perturbation theory and from verification via large scale computer calculations, how particular measured quantities from S behave. In particular, analysis involved two quantities, namely the thermalization measure S and the decoherence measure a. However, other similar measurements or measurable quantities of S can also be considered. The analysis assumed P+S was in the canonical thermal state ensemble. However, the analysis should be equally valid for a quantum entirety prepared in a thermal state, for example by utilizing a gated quantum computer or a hybrid quantum computer. Decoherence and thermalization are two concepts in quantum statistical physics, wherein decoherence renders a quantum system classical due to the loss of phase coherence of the components of a system in a quantum superposition via interaction with an environment (or bath), and thermalization drives the system to a stationary state, the (micro) canonical ensemble via energy exchange with a thermal bath. If the entirety Hamiltonian H is comprised of N qubits, the dimension of the associated Hilbert space of wavefunctions is $2^N$.

The quantum entirety P+S+C may be completely embodied by qubits and implemented as any physical embodiment of qubits. Further and alternatively, any part of the quantum entirety P+S+C may also be embodied as any quantum system, while the dimension of the Hilbert space of P+S+C may be finite or may be infinite. The ensemble of typical states in this Hilbert space is the ensemble of all unit vectors chosen uniformly at random from all unit vectors, which we depict as the vector $|\Psi_0\rangle$, which has complex elements. The inverse temperature is $\beta=1/k_B T$, wherein $k_B$ is Boltzmann's constant and T is the absolute temperature. The canonical thermal state ensemble at a temperature T is defined as the ensemble of all states given by $|\Psi_\beta\rangle = \exp(-\beta H/2)|\Psi_0\rangle$, and then normalized to be a unit vector. Here, H is the Hamiltonian of the entirety P+S+C.

Figure 2:
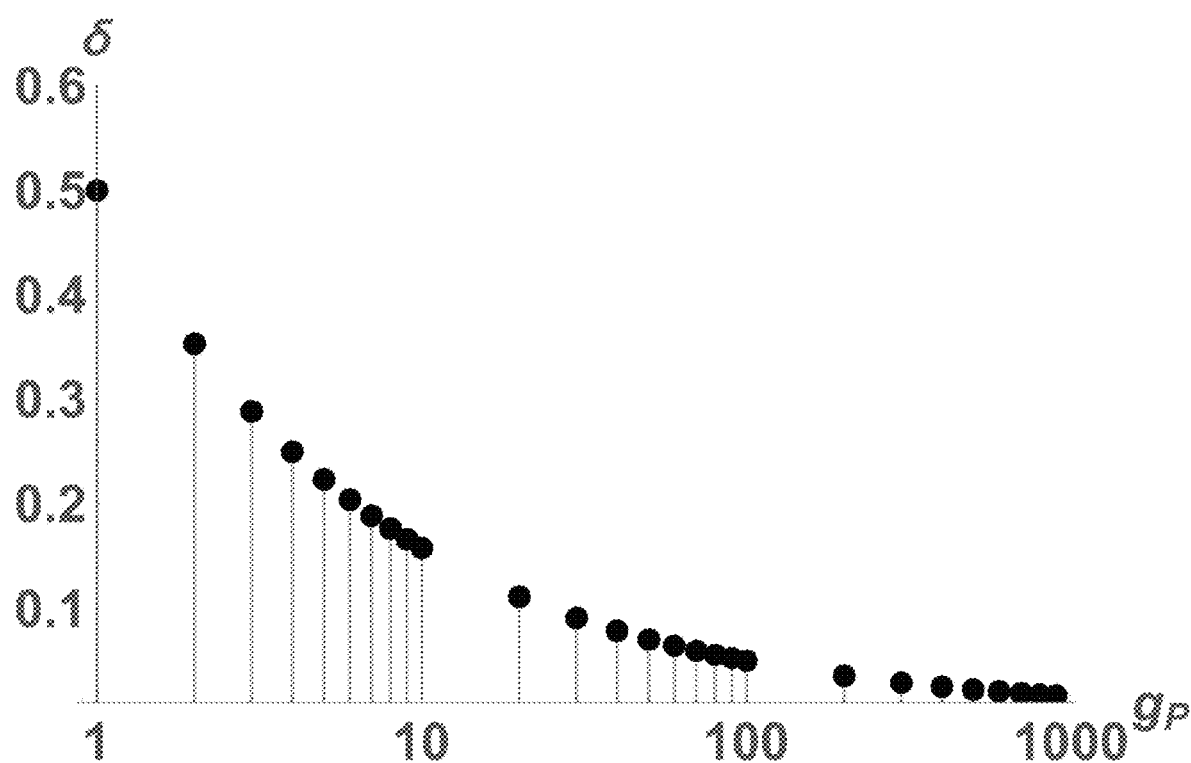
FIG. 2 shows a graphical linear-log plot representation of, for $g_S=2$, the value of the thermalization parameter $\delta$ as a function of the problem Hamiltonian ground state degeneracy $g_P$.
Figure 3:
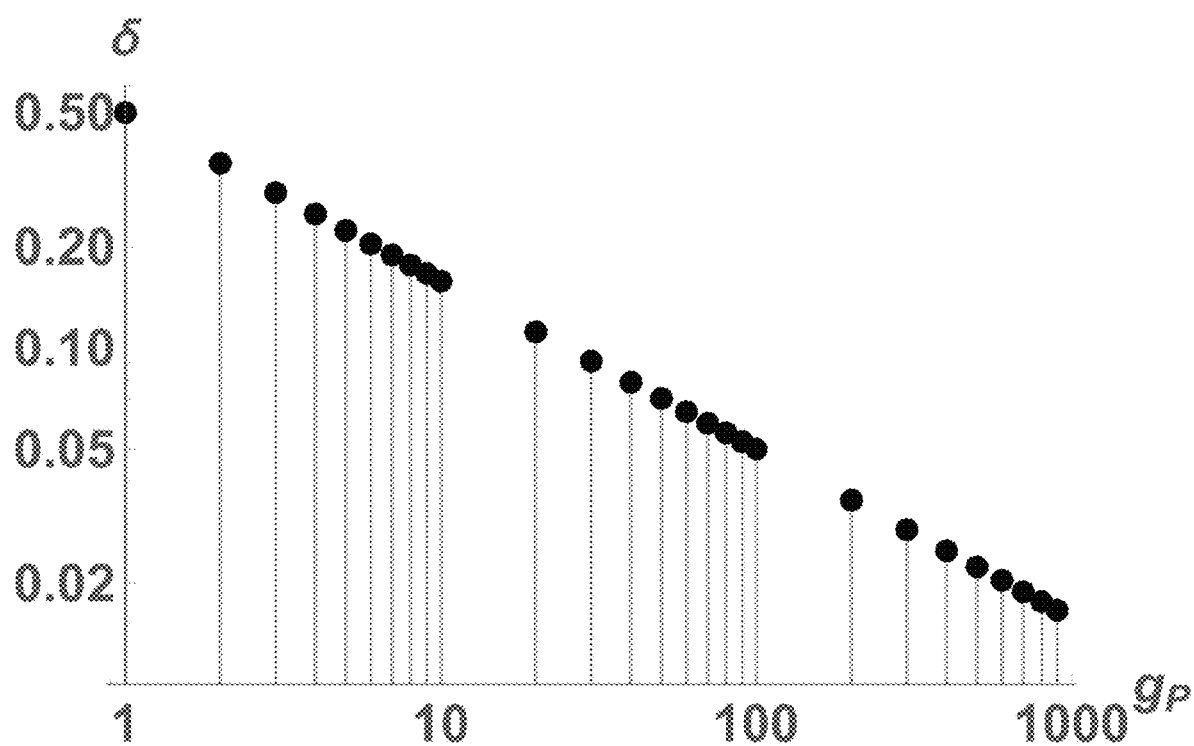
FIG. 3 shows a graphical log-log scale plot representation of the data shown in FIG. 2.
Figure 4:
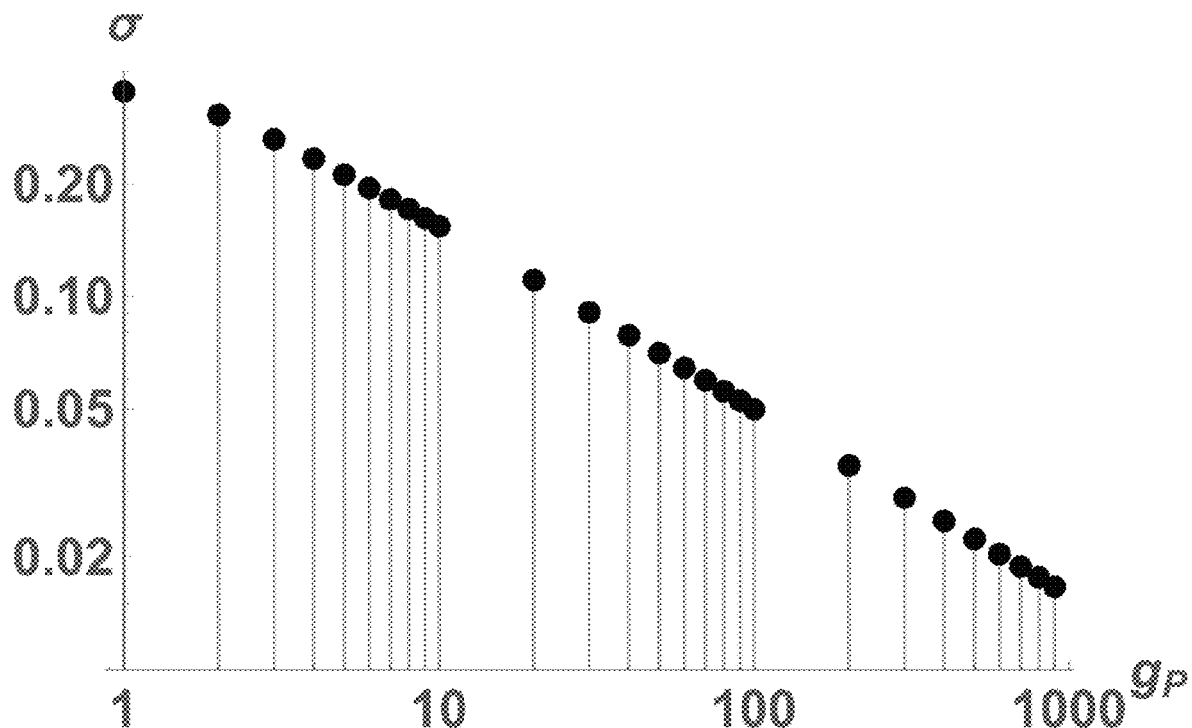
FIG. 4 shows a graphical log-log scale plot representation of the decoherence measure $\sigma$, which is a function of the ground state degeneracy $g_P$ of the problem Hamiltonian, using the same parameters and limits as in FIGS. 2 and 3.

The present invention of the quantum oracle is realized for particular analyzed limits. The first limit is all coupling Hamiltonians are zero, or at least very small. Note that even when all coupling Hamiltonians are zero, the three parts of the wavefunction of the entirety are still entangled due to quantum mechanics. It is this quantum entanglement which allows measurements to be performed on part S in order to obtain information about part P, without directly measuring any quantity from P. With the additional assumption of low enough temperature for P+S, prior analyses showed the expectation value for the square of the thermalization measure of S is $E(\delta^2)=(g_S-1)/g_S^2 g_P^2$. An example of this function is shown in FIGS. 2 and 3. FIG. 2 shows, for the case $g_S=2$, the value of the thermalization parameter $\delta$ is shown as a function of the problem Hamiltonian ground state degeneracy $g_P$. In FIG. 2, which shows a linear-log plot, only certain integer values of $g_P$ are shown. The results are for low temperature, for P+S being entangled with measured quantities from the canonical thermal state ensemble, and for all coupling Hamiltonians set to zero. FIG. 3 shows the same data and results as in FIG. 2, but on a log-log scale. Similarly, for the decoherence measure of S, $$E(\sigma^2) = \frac{(g_S-1)(g_S g_P - 1)}{2 g_S^2 g_P^2},$$

with an example shown in FIG. 4. FIG. 4 shows the decoherence measure $\sigma$, which is a function of the ground state degeneracy $g_P$ of the problem Hamiltonian, and utilizes the same parameters and limits as in FIGS. 2 and 3. These equations may be inverted to give the degeneracy $g_P \approx (g_S-1)/g_S^2 \delta^2$ of the problem Hamiltonian $H_P$ given the measured thermalization measure $\delta$ of part S. Similarly for a measured value for the decoherence measure $\sigma$ of S, giving $g_P \approx [g_S-1+\sqrt{(g_S-1)^2-8\sigma^2(g_S-1)}]/2 g_S \sigma^2$. It is assumed the degeneracy $g_S$ is known, for example from exact diagonalization of $H_S$. Taking into account measurement error for either quantity will provide a range of possible values for $g_P$. By performing repeated measurements on S to obtain, for example a measured value for $\delta$, the quantum oracle returns the value or range of values for $g_P$.

Each Hamiltonian corresponds to an experimental quantum system. For example, the problem Hamiltonian $H_P$ may correspond to $N_P$ coupled qubits. The qubits may be implemented in the quantum device using any physical embodiment, such as superconducting quantum interference devices (SQUIDS), anyons, photons, trapped ions or atoms, semiconductors, or other physical implementations. Furthermore, at least the coupling Hamiltonians must be controllable or programmable and time dependent (when they are non-zero). They may be controllable as described by a number of references, either annealing the time-dependent Hamiltonians or using gated qubit arrangements. For example, on a gated quantum computer, a QAOA (Quantum Alternating Operator Ansatz) or other algorithmic procedure may be utilized to obtain a thermal state. The quantum entirety P+S+C must be at low temperatures for the oracle to provide $g_P$. The concept of low temperature depends both on the specific Hamiltonians involved and the methodology of physical hardware implementation. In particular, the energy associated with the temperature may be smaller than the energy difference between the ground states and the excited states of the entirety Hamiltonian.

For definitiveness, the invention concentrates on finding $g_P$ by measuring $\delta$ on S, assuming P+S is ready to provide measurements from the canonical thermal state ensemble. Assume S is composed of $N_S$ qubits, which are coupled together ferromagnetically so its degeneracy is $g_S=2$, namely the two ground states have all $N_S$ qubits 1 (spin up) or all qubits 0 (spin down). Any other $H_S$ can be used as long as $g_S$ is known and small. The dimension of the Hilbert space of S is $D_S$ which is equal to $2^{N_S}$, because each qubit has two states. Each measurement on S will give one of the $D_S$ states in a convenient basis, and performing M measurements gives a histogram of the number of times each state was found. Comparing this histogram with the Boltzmann distribution for the known Hamiltonian $H_S$ gives the thermalization value $\delta$. In particular, $\delta$ is a measure of the difference between the distribution when S is entangled with P and when S is not entangled with P, for the same temperature and the same Hamiltonian. For every measurement, the entirety P+S+C must be prepared in the same fashion or in a similar fashion. The number of measurements must be much larger than $D_S$, so usually S will be comprised of a small number of qubits. Moreover, if S is composed of identical subsystems, every preparation of P+S will allow a measurement on every subsystem of S.

The problem Hamiltonian $H_P$ may be comprised of qubits, with any physical embodiment of qubits. Alternatively, it may be any other quantum system, even one with a Hamiltonian which does not have a finite Hilbert space. It may also be an unknown Hamiltonian obtained in a gated quantum computer, for example by a QAOA procedure. For qubit systems, the problem Hamiltonian may be either a stoquastic or a non-stoquastic Hamiltonian. Furthermore, the problem Hamiltonian may be made up of different terms which need not commute with each other. For example, for qubit systems the problem Hamiltonian may have single-qubit terms such as transverse field terms $\sigma_j^x$ and field terms $\sigma_j^z$ for the $j^{th}$ qubit, with the $\sigma^x$, $\sigma^y$, and $\sigma^z$ the three Pauli matrices (not to be confused with the decoherence measure $\sigma$). The problem Hamiltonian may also have two-qubit terms, or even multi-qubit terms such as the three qubit term $\sigma_i^x \sigma_j^x \sigma_k^z$ for atoms labeled i, j, and k, respectively.

Adiabatic quantum computation originally was intended to solve optimization problems and has advanced to become a vital alternative to the standard circuit model of quantum computation. All current quantum annealing computers provide a quantum oracle to return a ground state of a problem Hamiltonian $H_P$, which can be viewed as an Ising spin glass Hamiltonian, in other words a quantum system with frustration. Perfect adiabatic quantum computers allow problems which are NP-hard to be performed, thereby allowing computation of problems believed to be too difficult for any classical computer to compute as problem sizes become larger. For example, adiabatic quantum computers provide a quantum oracle which can solve SAT, Boolean satisfiability, problems. For a given Boolean expression the quantum oracle returns a single solution of a ground state of $H_P$. The present invention gives a quantum oracle for the ground state degeneracy $g_P$ of the problem Hamiltonian. The quantum oracle of the invention returns the number of ground states of the particular Ising spin glass Hamiltonian. or for SAT the number of solutions which satisfy the particular SAT problem. In terms of computational complexity classes, the quantum oracle of the invention provides answers to problems in #P, while all current adiabatic quantum computers provide answers in NP-hard. Combining these two types of oracles enables for the first time a method to obtain all of the solutions, thereby solving, for example, All-SAT problems, on large problems. The All-SAT problem has numerous applications in fields such as Artificial Intelligence (AI). More precisely, the quantum oracle of this invention returns solutions which are in the computational complexity class #BQP, which is not harder than its classical counting complexity class counterpart #P. The counting complexity class #BQP contains counting problems associated with the problems in the complexity class BQP (bounded-error quantum polynomial time). There is a similar relationship between the counting complexity class #P and the complexity class P (decision problems that can be solved by a deterministic Turing machine utilizing a polynomial amount of computing time).

Figure 5:
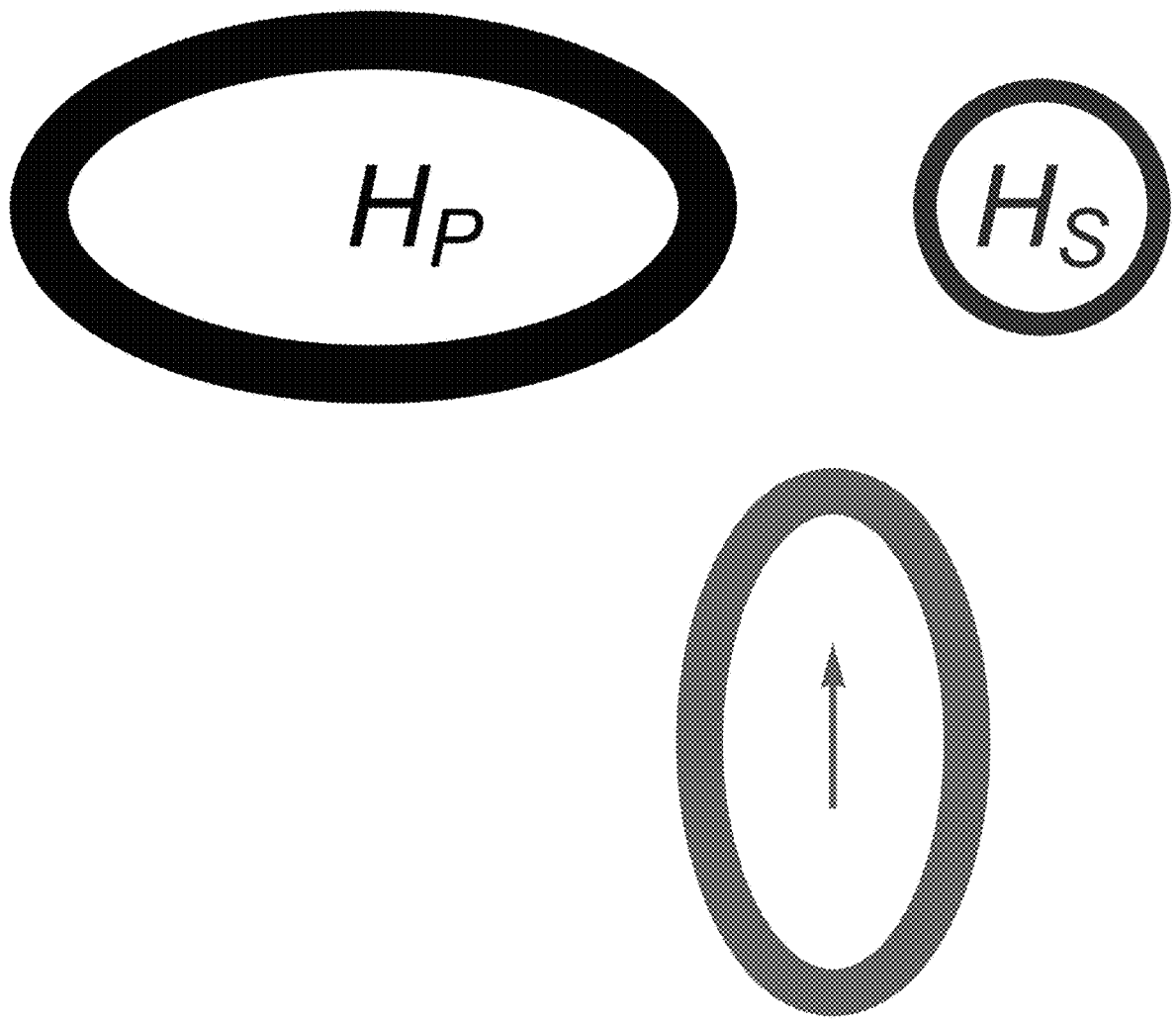
FIG. 5 shows a sketch of the setup of the quantum entirety of FIG. 1, just before the measurement on S is performed.

The parts P+S must have a wavefunction drawn from a particular ensemble before the measurement is performed on S, namely the canonical thermal state ensemble. Alternatively, the parts P+S may have a wavefunction drawn from the thermal state ensemble, namely the wavefunction may be a thermal state. The proper wavefunction may be obtained by manipulating or programming the Hamiltonian $H_C$, as well as manipulating the three coupling Hamiltonians. Also, before the measurement on S the part C must have a degeneracy which is small, preferably being non-degenerate. The three coupling Hamiltonians before the measurement on S must be zero, or at least very small. See FIG. 5. FIG. 5 shows a sketch of the setup of the quantum entirety of FIG. 1, just before the measurement on S is performed. All coupling Hamiltonians have been manipulated or programmed to zero, and part C is in a non-degenerate state symbolized by the up arrow. These conditions may be accomplished, for example, by annealing by introducing a time dependent strength $f_{PS}(t)$ for $H_{PS}$ where before the measurement on S the strength $f_{PS}=0$. Similarly, the other couplers can be annealed in a particular fashion. Another alternative is reverse annealing, wherein initially $H_{PS}=0$, it then is manipulated or programmed to be non-zero, and before the measurement on S again one has $H_{PS}=0$. Another alternative is on a gated quantum computer to have a QAOA procedure with only very small coupling Hamiltonians. The programming of the parts of the Hamiltonian, and the manipulation of the parts of the Hamiltonian, may be accomplished using either annealing methodologies or gated methodologies. For example, before the measurement on S one could anneal the Hamiltonian $H_C$ to have completely ferromagnetic couplings with an applied magnetic field, or alternatively one could perform a measurement on C thereby ensuring a partial collapse of the wavefunction of C into the single measured state.

An example of one embodiment of the present invention is depicted as in FIGS. 1 and 5. A quantum computer is based on a particular embodiment of a quantum spin one-half, or two-level quantum system, into physical hardware to enable a single qubit. A string of these physical qubits are put together to form a physical qubit register. For example, the qubits and qubit register may be embodied as superconducting circuits, such as in existing D-Wave, Intel, or IBM quantum devices. The length of the qubit register in FIGS. 1 and 5 is the number of qubits on which the entirety Hamiltonian acts, namely the log to the base 2 of the Hilbert space of the entirety Hamiltonian of P+S+C.

The Hamiltonians of a quantum computer act on the qubit register. The Hamiltonian may have various physical embodiments. For example, in D-Wave machines the single-qubit parts of the Hamiltonian are embodied by a bias in the superconducting Josephson junction rings which embody the qubit. The two-qubit operators in the D-Wave implementation are embodied as a magnetic flux that is mainly enclosed by two superconducting Josephson junction rings. It is important to note any physical embodiment of the qubits, the qubit register, and the quantum Hamiltonian can be utilized, together with the present invention, thereby enabling a practitioner trained in the art of engineering any embodiment of a quantum computing device to obtain the desired degeneracy of the ground state of a quantum problem Hamiltonian $H_P$.

The invention generally consists of a novel method and system for constructing, programming, and/or manipulating quantum computing hardware using a quantum computing system to provide a quantum oracle which returns or obtains the number of quantum ground states or desired ground state degeneracy of a system governed by a quantum problem Hamiltonian $H_P$, wherein the quantum computing system is an adiabatic quantum computer, a gate-based quantum computer, a hybrid quantum computer, or a combination thereof. The novel method and system comprises implementing the quantum entirety of Hamiltonians comprising P+S+C, or $H_p+H_s+H_c$, as any physical embodiment of qubits or as any quantum system. wherein the dimension of the Hilbert space of P+S+C, or $H_p+H_s+H_c$, may or may not be finite, and further wherein $H_p$ is a quantum problem Hamiltonian, $H_s$ is a measured Hamiltonian part, and $H_c$ is the quantum Hamiltonian which when $H_s$ is measured has a ground state degeneracy of one. Further, the method and system comprises measuring average quantities on $H_s$ to allow the quantum oracle to provide the ground state degeneracy $g_P$ of $H_p$.

The quantum entirety of Hamiltonians is comprised of at least three distinct parts, as in FIG. 1 labeled P, S, and C, or and $H_p$, $H_s$, and $H_c$, and at least three coupling Hamiltonians $H_{pc}$, $H_{ps}$, and $H_{sc}$, between the at least three distinct parts. The invention further provides for the quantum oracle that returns or obtains either an integer for $g_p$ or a range of values within which $g_p$ falls. The invention encompasses manipulating and/or programming the Hamiltonian $H_c$ such that, before the measurement on $H_s$, the ground state of $H_c$ is not degenerate, or at least the degeneracy of $H_c$ is known and small, or less than or equal to about five.

The methodology and system also comprises manipulating and/or programming the Hamiltonian $H_c$ such that, before the measurement on $H_s$, the measurement on $H_s$ returns values from, or as if they are drawn from, the canonical thermal state ensemble (CTSE), or alternatively from a thermal state drawn from the Boltzmann weighted ensemble of all thermal states, of P+S, or $H_p+H_s$. In other words, the individual thermal state is chosen from the ensemble of Boltzmann weighted all thermal states. Moreover, before the measurement on $H_s$, the coupling Hamiltonians are zero or at least sufficiently small so as to not modify the value of the measurable quantity compared to the coupling(s) being zero.

The present invention also comprises measuring $H_s$ for the measure of thermalization $\delta$, the measure of decoherence $\sigma$, and/or any other suitable measured or measureable quantity. The invention further comprises utilizing the quantum oracle to provide solutions to distinct types of counting problems, such as the #P part of all-SAT problems, for example, contained in computational complexity class #P, complexity class #BQP, or a combination thereof. The quantum oracle provides exact possibilities, or alternatively a range of possibilities, for any counting problem in the computational complexity class #P, complexity class #BQP, or a combination thereof.

The method and system of the invention provides the ability for a designer to utilize specific superconducting hardware or trapped ion process, for example, to design a computational complexity class #P classical-type device (problems solvable via a Turing machine in polynomial time), a #BQP (bounded-error quantum polynomial time) quantum-type device, or a combination thereof.

All parameters presented herein including, but not limited to, sizes, dimensions, times, temperatures, pressures, amounts, distances, quantities, ratios, weights, volumes, percentages, and/or similar features and data and the like, for example, represent approximate values and can vary with the possible embodiments described and those not necessarily described but encompassed by the invention. Recitations of numerical values and/or numerical ranges can be read to include the term 'about'. Further, references to 'a' or 'an' concerning any particular item, component, material, or product is defined as at least one and could be more than one. The terms 'comprises' and 'includes' and variations thereof are not to have a limiting meaning.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, methods, analyses, materials, components, dimensions, compositions, and/or calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. All embodiments herein can be made without undue experimentation in light of the disclosure. The Applicants have described the preferred embodiments of the invention, but it should be understood that the broadest scope of the invention includes such modifications as additional or different methods and materials. Many other advantages of the invention will be apparent to those skilled in the art from the above descriptions and the subsequent claims. Thus, the present invention should not be limited by any of the above-described exemplary embodiments.

The processes, devices, products, apparatus and designs, structures, configurations, systems, methods, and/or compositions of the present invention are often best practiced by empirically determining the appropriate values of the operating parameters or by conducting simulations to arrive at best design for a given application. Accordingly, all suitable modifications, combinations, and equivalents should be considered as falling within the spirit and scope of the invention.

REFERENCES

1. T. Albash and D. A. Lidar, "Adiabatic quantum computation", Reviews of Modern Physics, vol. 90, article 015002 [64 pages] (2018).
2. B. Brown, S. T. Flammia, and N. Schuch, "Computational difficulty of computing the density of states", Physical Review Letters 107, 040501 [4 pages] (2011).
3. M. A. Novotny, F. Jin, S. Yuan, S. Miyashita, H. De Raedt, and K. Michielsen, "Quantum decoherence and thermalization at finite temperature within the canonical-thermal-state ensemble", Physical Review A, vl. 93, article 032110 [46 pages] (2016).
4. D. Roth, "On the hardness of approximate reasoning", Artificial Intelligence, vol. 82 (1-2), 1996.
5. U.S. Pat. No. 9,355,362, "Quantum bits and method of forming the same", published May 31, 2016.
6. U.S. Pat. No. 9,350,460, "System and method for quantum information transfer between optical photons and superconducting qubits", published May 24, 2016.
7. U.S. Pat. No. 9,953,269, "Modular array of vertically integrated superconducting qubit devices for scalable quantum computing", published Apr. 24, 2018.
8. U.S. Pat. No. 9,369,133, "Hybrid quantum circuit assembly", published Jun. 14, 2016.
9. U.S. Pat. No. 9,721,209, "Method and system for efficient decomposition of single-qubit quantum gates into Fibonacci anyon braid circuits", published Aug. 1, 2017.
10. U.S. Pat. No. 6,633,053, "Method and apparatus for creating at least one qubit in a quantum computing device", published Oct. 14, 2003.
11. U.S. Pat. No. 9,773,208, "Quantum information processing", published Sep. 26, 2017.
12. U.S. Pat. No. 9,530,873, "Semiconductor adiabatic qubits", published Dec. 27, 2016.
13. U.S. Pat. No. 7,411,187, "Ion trap in a semiconductor chip", published Aug. 12, 2008.
14. U.S. Pat. No. 9,886,668, "Advanced processing apparatus", published Feb. 6, 2018.
15. U.S. Pat. No. 9,934,468, "Constructing and programming quantum hardware for quantum annealing processes", published Apr. 3, 2018.
16. U.S. Pat. No. 9,396,440, "Systems and methods for solving combinatorial problems", published Jul. 19, 2016.
17. U.S. Pat. No. 9,524,470, "Modular array of vertically integrated superconducting qubit devices for scalable quantum computing", published Dec. 20, 2016.
18. U.S. Pat. No. 9,882,112, "Multi-qubit device and quantum computer including the same", published Jan. 30, 2018.
19. S. Hadfield, Z. Wang, B O'Gorman, E. G. Rieffel, D. Venturelli, and R. Biswas, "From the Quantum Approximate Optimization Algorithm to a Quantum Alternating Operator Ansatz", Algorithms, vol. 34, pages 1-45 (2019).

What is claimed is:

1. A method for manipulating quantum computing hardware using a quantum computing system to provide a quantum oracle which resolves quantum information of a system governed by a quantum problem Hamiltonian $H_p$, the method comprising:
    implementing, by the quantum computing system, a quantum entirety of Hamiltonians comprising $H_p+H_s+H_c$, as a physical embodiment of qubits, wherein a Hilbert space of $H_p+H_s+H_c$ comprises a dimension, and wherein $H_p$ is a quantum problem Hamiltonian, $H_s$ is a measured Hamiltonian part, and $H_c$ is a quantum Hamiltonian which when $H_s$ is measured has a ground state degeneracy of one; and
    measuring, by the quantum computing system, average quantities on $H_s$ to allow the quantum oracle to provide a ground state degeneracy ($g_p$) of $H_p$, wherein the quantum computing system is an adiabatic quantum computer, a gate-based quantum computer, a hybrid quantum computer, or a combination thereof.

2. The method of claim 1, wherein the quantum oracle resolves either an integer for $g_p$ or a range of values within which $g_p$ falls.

3. The method of claim 1, further comprising programming the Hamiltonian $H_c$ such that, before the measuring average quantities on $H_s$, is not degenerate, or a degeneracy of $H_c$ is known and is less than or equal to five.

4. The method of claim 1, further comprising programming the Hamiltonian $H_c$ such that, the measurement on $H_s$ returns values from a canonical thermal state ensemble (CTSE), or from a thermal state drawn from a Boltzmann weighted ensemble of all thermal states of $H_p+H_s$.

5. The method of claim 4, wherein the quantum entirety of Hamiltonians is comprised of at least three distinct parts and at least three coupling Hamiltonians between the at least three distinct parts, wherein the three distinct parts comprises $H_p+H_s+H_c$, and wherein the at least three coupling Hamiltonians comprises a coupling between $H_p$ and $H_c$ ($H_{pc}$), a coupling between $H_p$ and $H_s$ ($H_{ps}$), and a coupling between $H_s$ and $H_c$ ($H_{sc}$).

6. The method of claim 5, wherein, before the measurement on $H_s$, the at least three coupling Hamiltonians are zero.

7. The method of claim 1, further comprising measuring $H_s$ for a measure of thermalization ($\delta$) or a measure of decoherence ($\sigma$).

8. The method of claim 1, wherein the problem Hamiltonian $H_p$ is a problem Hamiltonian of a counting problem contained in computational complexity class #P, computational complexity class #BQP, or a combination thereof.

9. The method of claim 8, wherein measuring the average quantities on $H_s$ to allow the quantum oracle to provide $g_p$ of $H_p$ results in a range of possibilities for the $g_p$ of $H_p$.

10. A quantum computing system to provide a quantum oracle which resolves quantum information of a system governed by a quantum problem Hamiltonian $H_p$, the quantum computing system comprising:
   an adiabatic quantum computer, a gate-based quantum computer, a hybrid quantum computer, or a combination thereof, which:
      implements a quantum entirety of Hamiltonians comprising $H_p+H_s+H_c$, as a physical embodiment of qubits, wherein a Hilbert space of $H_p+H_s+H_c$ comprises a dimension, and wherein $H_p$ is a quantum problem Hamiltonian, $H_S$ is a measured Hamiltonian part, and $H_c$ is a quantum Hamiltonian which when $H_s$ is measured has ground state degeneracy of one; and
      measures average quantities on $H_s$ to allow the quantum oracle to provide a ground state degeneracy ($g_p$) of $H_p$.

11. The quantum computing system of claim 10, wherein the quantum oracle resolves either an integer for $g_p$ or a range of values within which $g_p$ falls.

12. The quantum computing system of claim 10, wherein the quantum computing system programs the Hamiltonian $H_c$ such that, before the measuring average quantities on $H_s$, the ground state of $H_c$ is not degenerate, or a degeneracy of $H_c$ is known and is less than or equal to five.

13. The quantum computing system of claim 10, wherein the system programs the Hamiltonian $H_c$ such that the measurement on $H_s$ returns values from a canonical thermal state ensemble (CTSE), or from a thermal state drawn from a Boltzmann weighted ensemble of all thermal states of $H_p+H_s$.

14. The quantum computing system of claim 13, wherein the quantum entirety of Hamiltonians is comprised of at least three distinct parts and at least three coupling Hamiltonians between the at least three distinct parts, wherein the three distinct parts comprises $H_p+H_s+H_c$, and wherein the at least three coupling Hamiltonians comprises a coupling between $H_p$ and $H_c$($H_{pc}$), a coupling between $H_p$ and $H_s$ ($H_{ps}$), and a coupling between Hs and $H_c$ ($H_{sc}$).

15. The quantum computing system of claim 14, wherein, before the measurement on $H_s$, the at least three coupling Hamiltonians are zero.

16. The quantum computing system of claim 10, wherein the system measures $H_S$ for a measure of thermalization ($\delta$) or a measure of decoherence ($\sigma$).

17. The quantum computing system of claim 10, wherein the problem Hamiltonian $H_p$ is a problem Hamiltonian of a counting problem contained in computational complexity class #P, computational complexity class #BQP, or a combination thereof.

18. The quantum computing system of claim 17, wherein measuring the average quantities on $H_s$ to allow the quantum oracle to provide $g_p$ of $H_p$ results in a range of possibilities for the $g_p$ of $H_p$.

* * * * *